Figure 1:
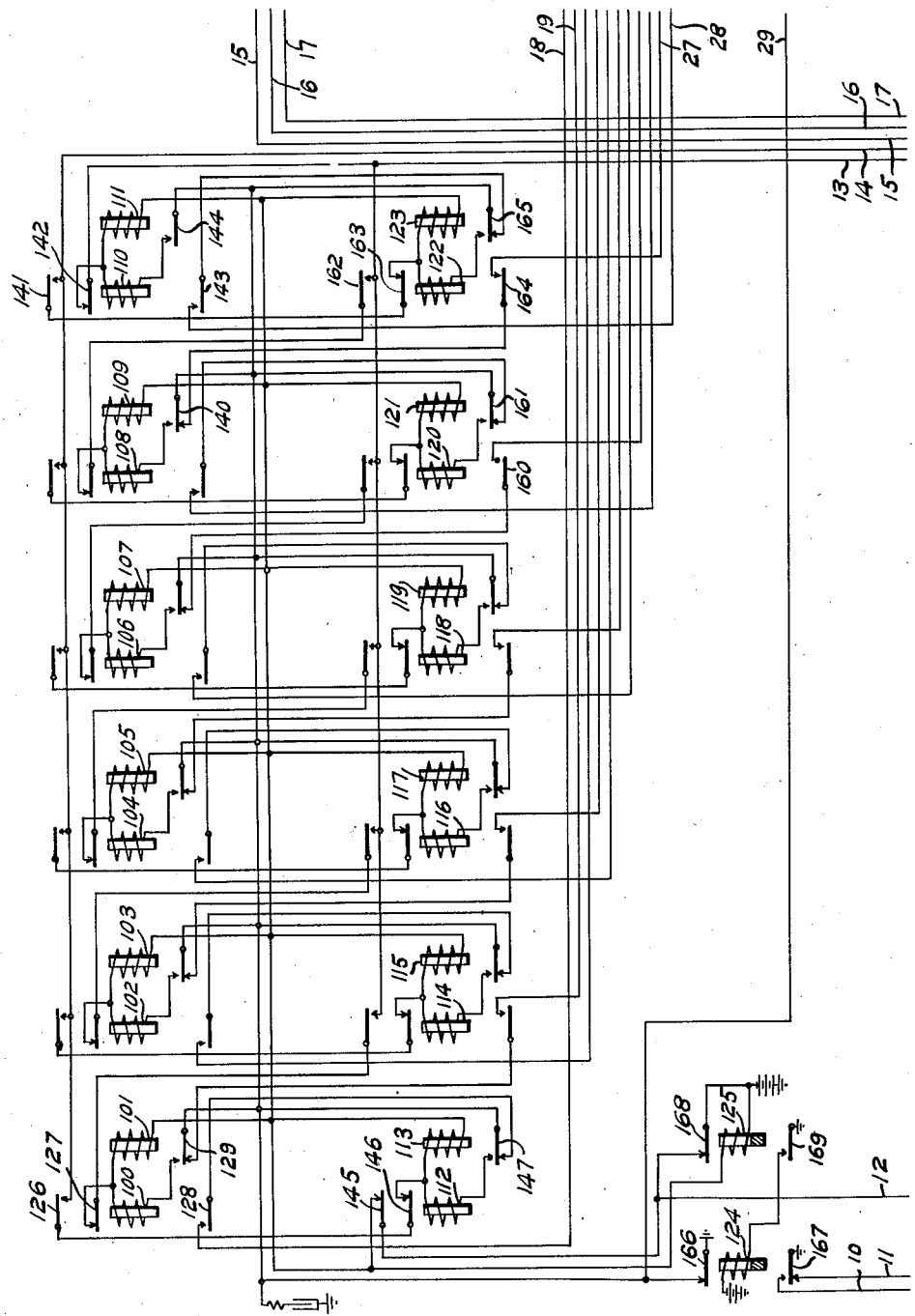

Aug. 27, 1929.　　　　T. U. WHITE　　　　1,726,009
SUPERVISING AND CONTROL SYSTEM
Filed April 28, 1925　　8 Sheets-Sheet 2

WITNESSES:

INVENTOR
Thomas U. White.
BY
ATTORNEY

Aug. 27, 1929.  T. U. WHITE  1,726,009
SUPERVISING AND CONTROL SYSTEM
Filed April 28, 1925    8 Sheets-Sheet 7

WITNESSES:

INVENTOR
Thomas U. White.
BY
ATTORNEY

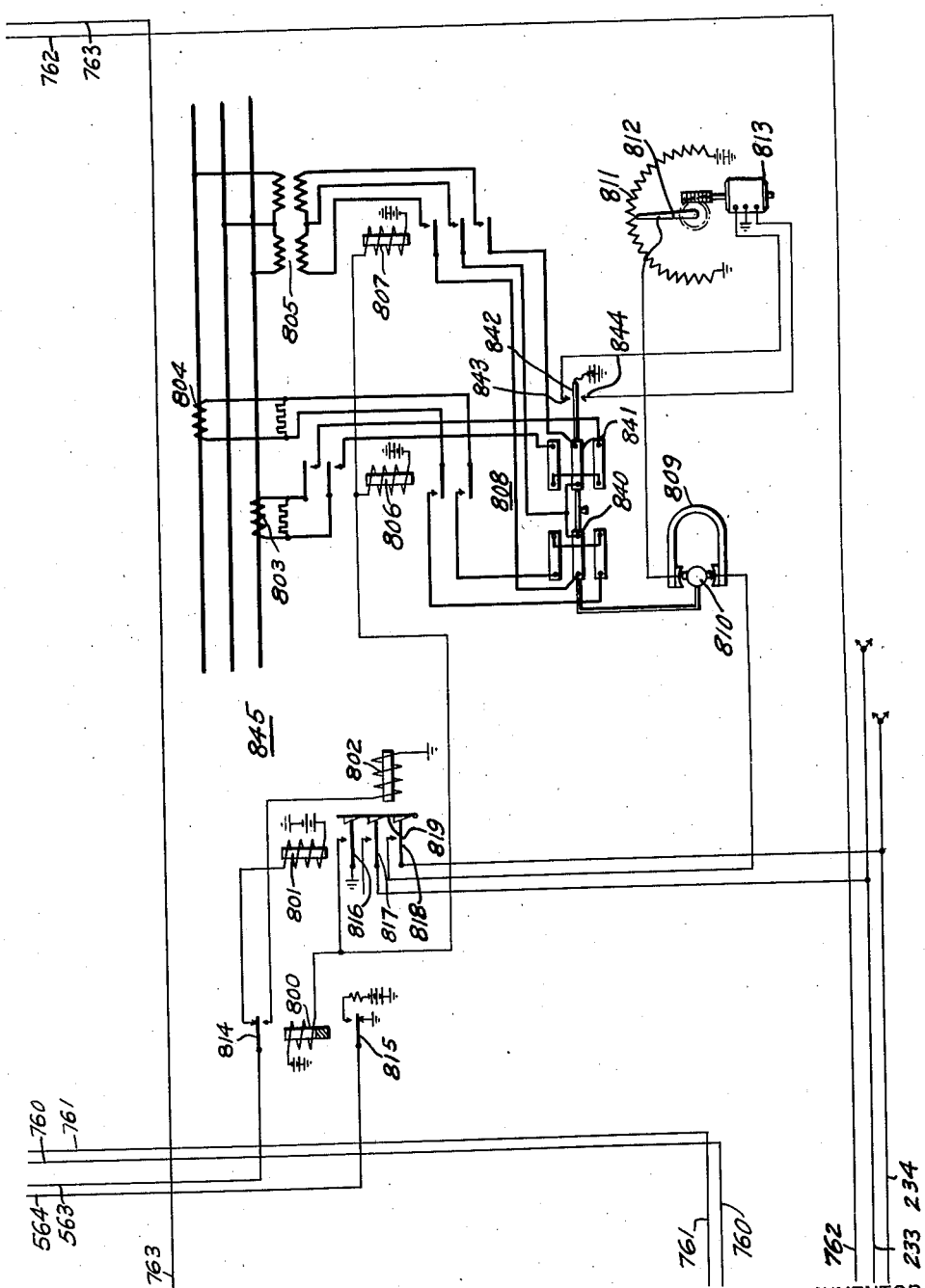

Patented Aug. 27, 1929.

1,726,009

UNITED STATES PATENT OFFICE.

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA.

SUPERVISING AND CONTROL SYSTEM.

Application filed April 28, 1925. Serial No. 26,437.

My invention relates, in general, to electrical control systems, and more particularly to systems for supervising and controlling remotely-disposed electrical apparatus, from a central point.

One object of my invention is to provide telemetric means which is adapted to function in conjunction with a system for supervising and controlling the remotely-disposed electrical equipment to inform the dispatcher at the central office of the electrical characteristics in circuits associated with the electrical apparatus under control and supervision.

Another object of my invention is to provide means for enabling the dispatcher to connect indicating equipment at his office with any desired circuit at the station or remote point to observe the electrical characteristics in any desired circuit without interfering with the operation of the selecting apparatus for controlling and supervising the remotely-disposed electrical apparatus.

Another object of my invention is to provide means for transmitting electrical measurements from a distant station to a central station by the use of the same selective system that is employed for supervising and controlling the electrical equipment in the station without interfering with the operation of the selecting apparatus for controlling and supervising the remotely-disposed electrical apparatus.

Another object of my invention is to provide means for transmitting electrical measurements from a distant station to a central station by the use of the same selective system that is employed for supervising and controlling the electrical equipment in the station without interfering with the functioning of the selective equipment to perform either operation.

Another object of my invention is to provide improved means for operating a group of relays at the central station and a group of relays at the distant station in synchronism.

Another object of my invention is to provide means under the control of the dispatcher at the central station for regulating the speed of the selecting operation.

There are other objects of the invention, which together with the foregoing, will be described hereinafter in the detailed specification which is to follow.

Referring now to the drawings, comprising Figs. 1 to 8, inclusive, sufficient apparatus and circuits have been shown, by means of the usual conventional diagrams, to enable my invention to be readily explained and understood.

The apparatus and circuits shown in Figs. 1 to 4, inclusive, are those located at the first or central station, and the apparatus and circuits shown in Figs. 5 to 8, inclusive, are those located at the second station.

In practicing my invention, I provide a group of counting relays at the first station and a group of counting relays at the second station. Controlling apparatus is provided at each station for operating the relays in the groups in a predetermined sequence. This control apparatus will be termed the driving circuit. There is a second group of relays associated with each group of counting relays. The relays in this second group are operated in a definite sequence under the control of the relays in the counting relay groups.

A plurality of keys are provided at the first station, one for each apparatus unit that it is desired to control at the second station. In addition, a plurality of lamps are provided, two for each apparatus unit that it is desired to supervise at the distant station. Indicating instruments are also provided at the first station. There is one indicating instrument for each electrical circuit of which it is desired to obtain the electrical characteristics. Additional instruments are provided for varying the electrical characteristics in each circuit.

There is provided, at the second station, a metering device associated with each circuit that the dispatcher desires to supervise. Each metering device is adapted to control a transmitting mechanism which operates to transmit the indication of the associated meter to the first station. Relays are provided at the first and second stations that are associated with each of the indicating and measuring instruments, respectively, in order that these devices may be connected together by the operation of the selective apparatus which includes the driving circuit and the groups of counting and selecting relays at each station.

Briefly, the operation of my invention proceeds as follows. When the dispatcher desires to operate the circuit interrupter, or other apparatus unit at the second station, he will operate the key at the first station corresponding to this unit and will then operate the starting key.

As a result of the operation of the starting key, the driving circuit begins to function to operate the relays in the counting relay groups in a definite sequence. The operation of the relays in the counting relay groups controls the operation of the relays in the selecting relay groups in a definite sequence. The operation of the selecting relays, in a definite sequence, connects the various keys at the first station to corresponding apparatus units at the second station over a two-conductor trunk line that extends between the first and second stations.

The operation of the driving circuit is interrupted when the operated key is connected to the desired apparatus unit. The dispatcher may then operate the control key to cause the functioning of the selected unit. As a result of the functioning of this unit, a circuit is closed to inform the dispatcher of the desired operation at the station. Following the operation of the signalling devices at the first station, the driving circuit is again permitted to function to operate the remaining relays in the counting relay groups. After all the relays in the counting relay groups have been operated, the apparatus is released and the driving circuit ceases to function.

When an apparatus unit at the second station is operated, the driving circuit again begins to function in order to operate the proper signalling devices at the first station to apprise the dispatcher of the operation at the second station. When the dispatcher desires to connect one of the indicating instruments with the corresponding metering instrument at the second station, he will operate the key associated with this instrument at the first station and will then operate the start key. The start key causes the functioning of the driving circuit in the same manner as before.

The counting relays are then operated to cause the operation of the selecting relays at the first and second stations in a definite sequence. When the proper selecting relays are operated to associate the indicating instrument at the first station with the metering instruments at the second station, the operation of the driving circuit is momentarily interrupted. A circuit is then completed for operating certain relays at the second station to cause the connection of the metering apparatus to the circuit.

As a result of this connection, there is a circuit completed for operating certain relays at the first station to connect the indicating instruments to the metering circuit, which comprises two conductors extending between the first and second stations. The driving circuit now resumes its functioning and the various selecting apparatus is restored to normal after all the relays in the counting relay groups have been operated. The indicating instrument at the first station, however, remains connected to the metering device at the second station over the metering conductors.

Referring now to Fig. 1, relays 100 to 125, inclusive, are of ordinary type. Relays 100 to 123, inclusive, comprise the counting relay group at the first station.

Figure 2:
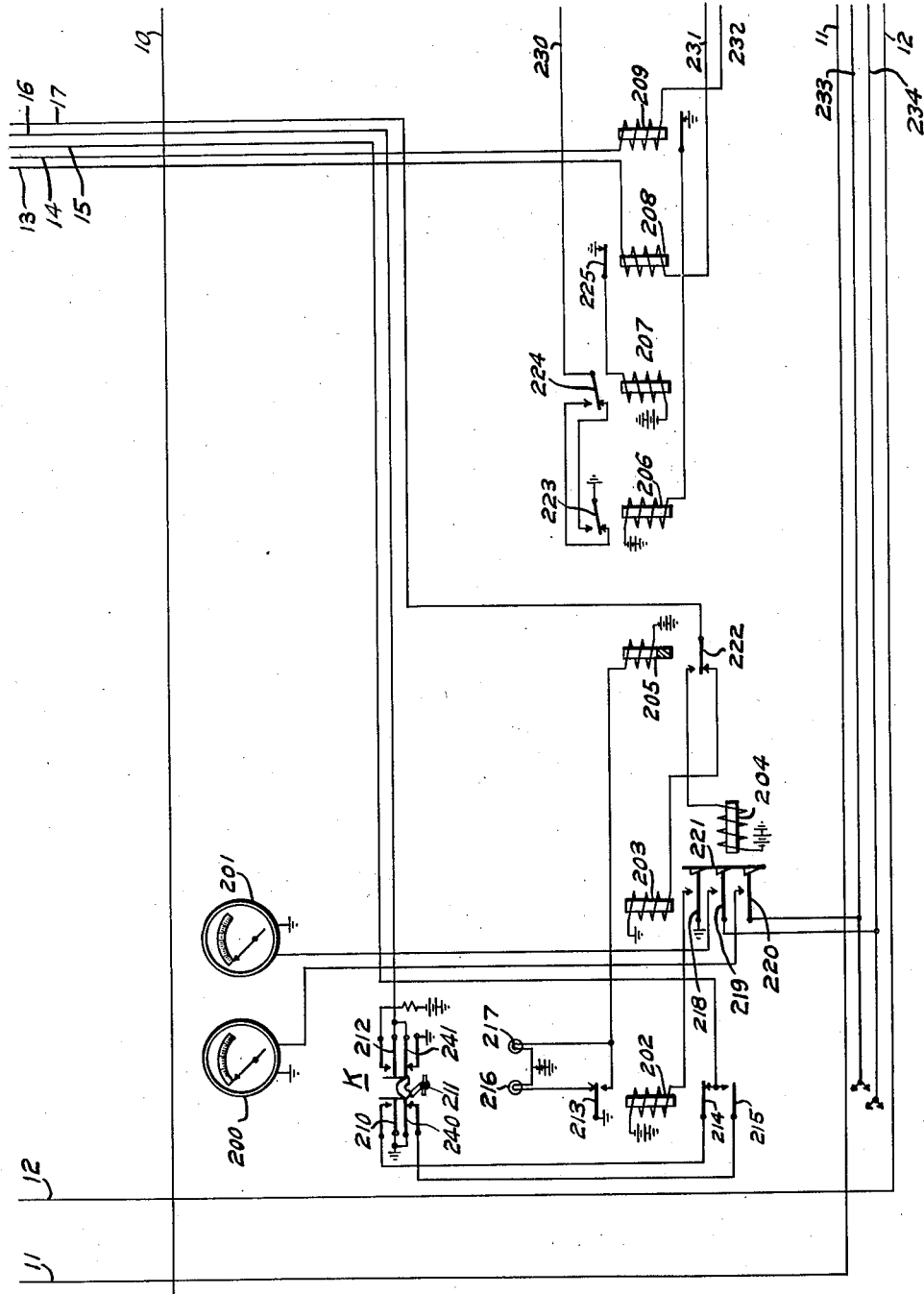

In Fig. 2, relays 202 to 205, inclusive, are associated with a key K. This key controls the connection of the indicating devices 200 and 201 to the metering circuit. The key K is double-throw key termed a twist key.

When the handle 211 of the key K is turned to the position other than that in which it is shown, springs 210 and 212 are operated into engagement with their working contacts and springs 240 and 241 are disengaged from their resting contacts. When the handle 211 is turned to the position shown in the drawings, the springs 210, 212, 240 and 241 assume the positions in which they are shown.

Relay 202 controls signalling devices 216 and 217 which are small incandescent lamps of the type employed in telephony. The relays 203 and 204 are mechanically latched. That is, these relays are constructed so that, when the relay 203 is energized, armatures 218, 219 and 220 are attracted into engagement with their working contacts and armature 221 of the relay 204 latches the armatures of the relay 203 in an operated position. The mechanical construction of the latching mechanism of these relays is shown in the copending application of Roy J. Wensley, Serial No. 750,183, filed Nov. 15, 1924, and assigned to the Westinghouse Electric & Manufacturing Company. These relays remain in this position, regardless of the deenergization of the relay 203, until the relay 204 is operated. Relays 206 to 209, inclusive, comprise a portion of the driving circuit at the first station.

Figure 3:
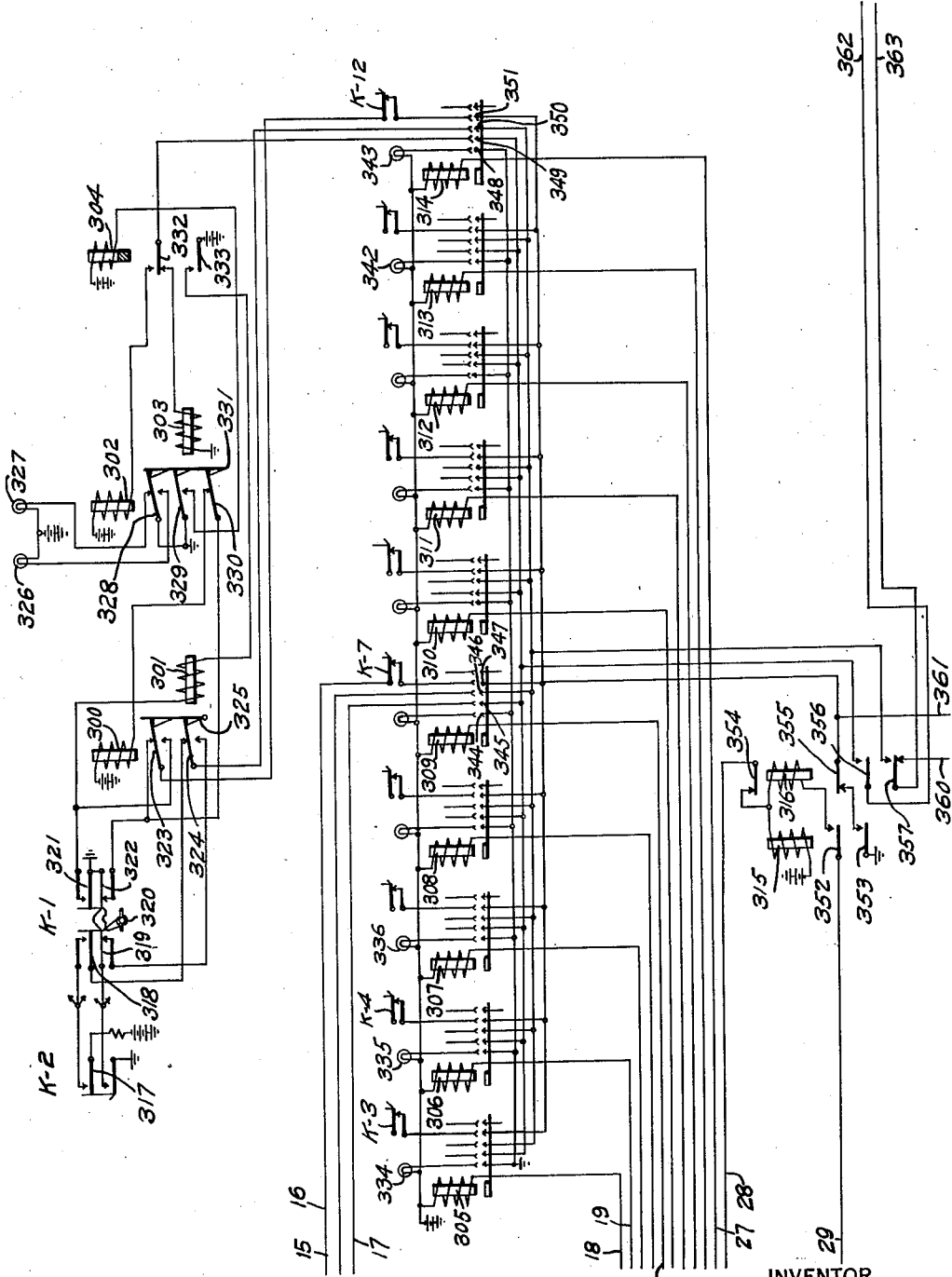

In Fig. 3, relays 305 to 314, inclusive, comprise the group of selecting relays at the first station. These relays have been shown as a special type of multi-contact relay, although it will be obvious that other types of multi-contact relays may be used. Relays 315 and 316 are of the usual type and control certain operations of the driving circuit, as will appear. A group of relays, such as relays 300 to 304, inclusive, is associated with each key, such as K—1. Key K—1 is a key similar to the key K, previously described. The relays 300, 301, 302 and 303 have their armatures mechanically interlocked in the same manner as the relays 203 and 204 in a manner as previously described. The relay 302 is adapted to control the operation of signalling devices 326 and 327. The relay 304 is of the usual slow-release type. A key K—2 is common to all the keys, such as K—1, that are employed for operating apparatus units or circuit interrupters at the second station.

Figure 4:
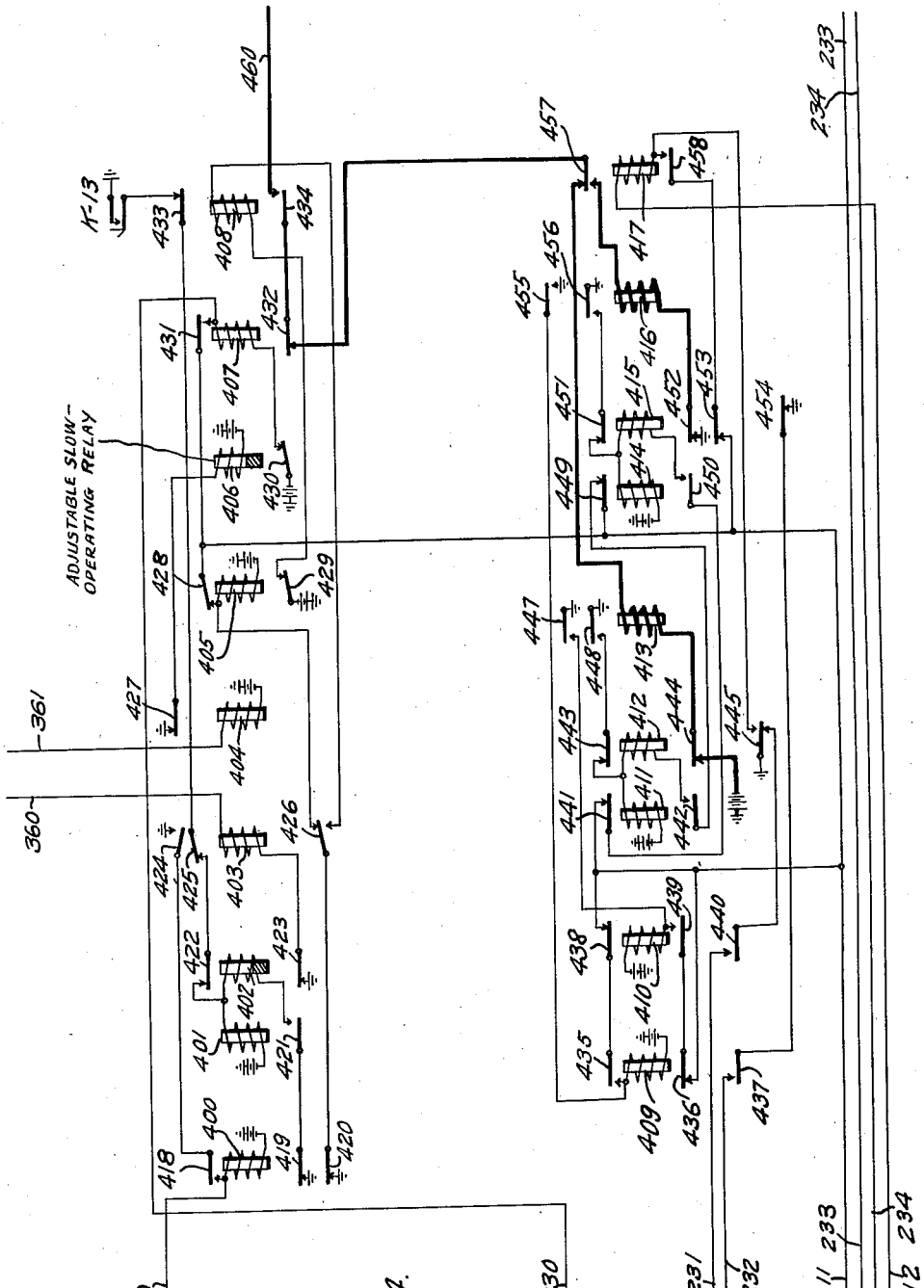

Relays 400 to 417, inclusive, of Fig. 4, comprise the remaining portion of the driving circuit at the first station. The relay 406 is a special type of adjustable slow-release relay. This relay is so constructed that its time constant may be changed by altering the number of copper slugs placed at one end of the core. The speed of selection is controlled by this relay and, consequently, the greater the time constant, the slower will be the speed of selection.

Figure 5:
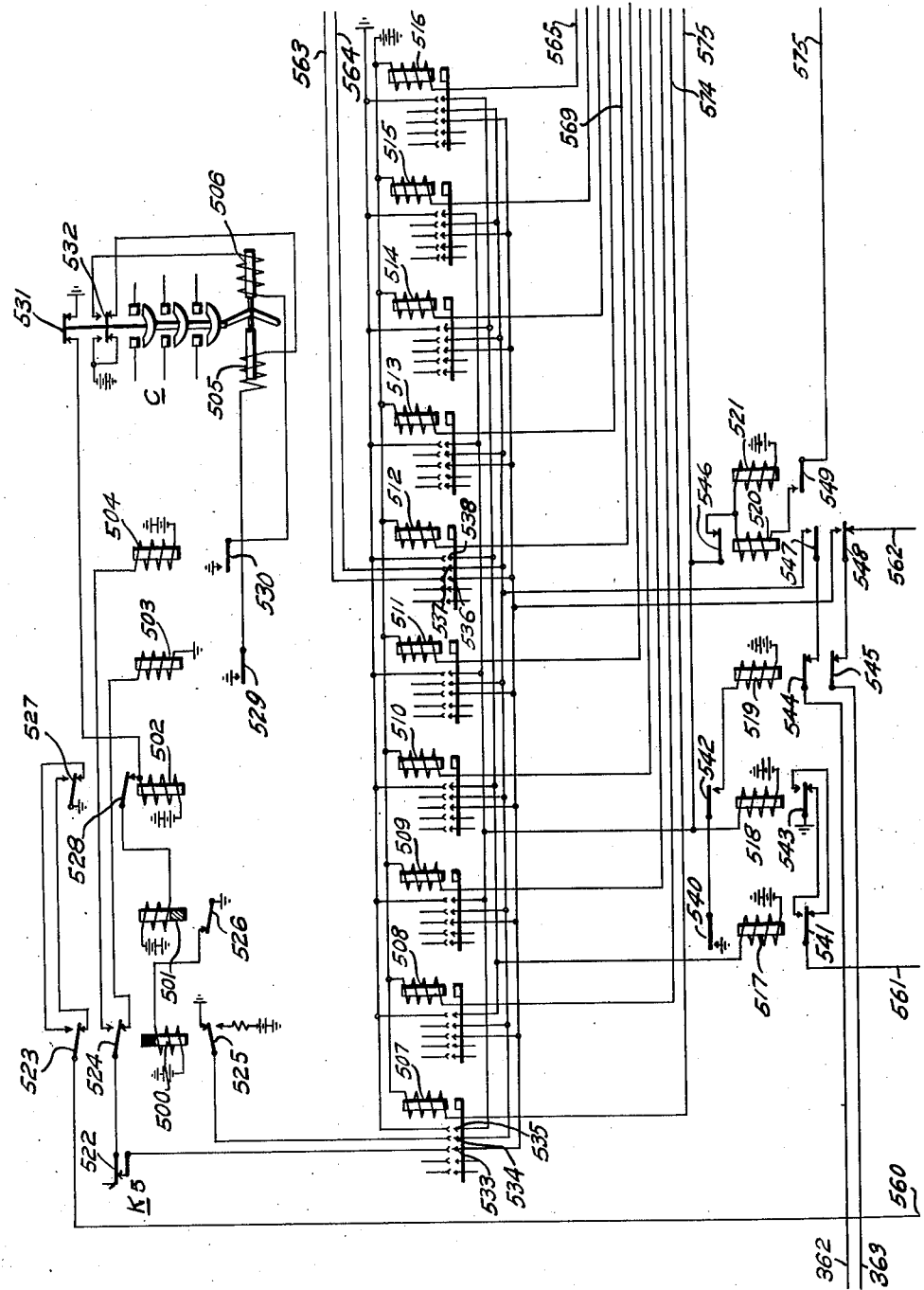
Figure 6:
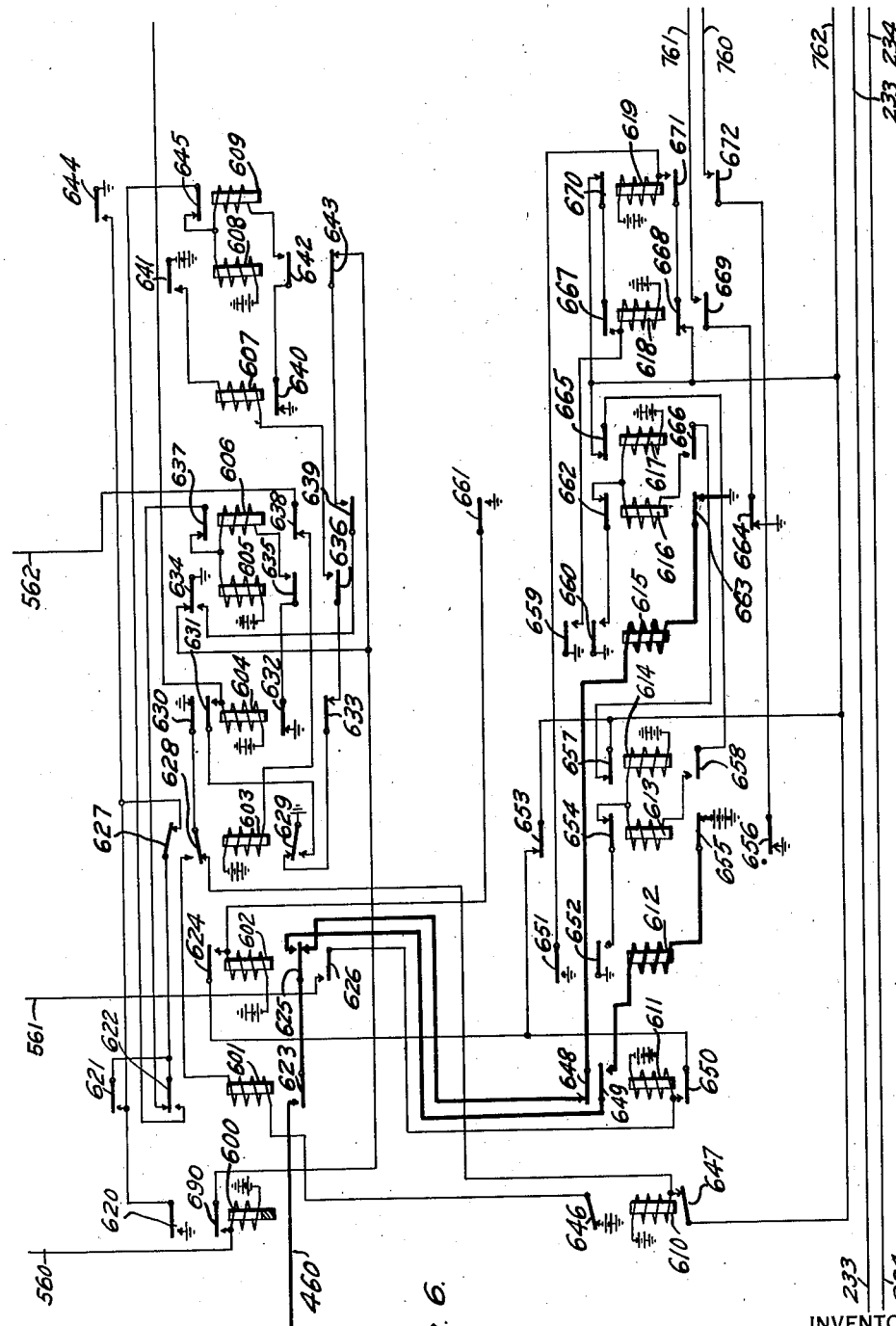
Figure 7:
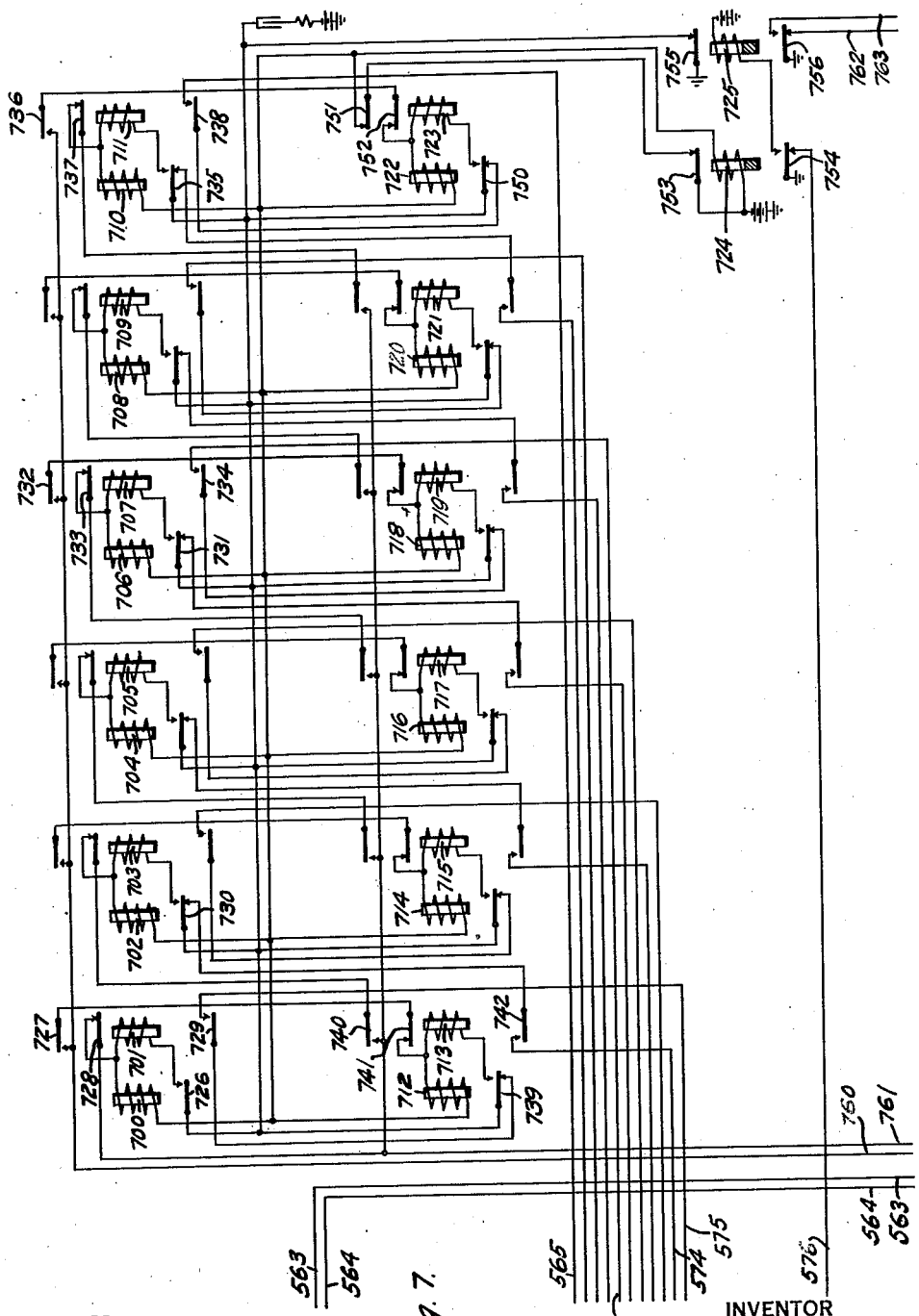

In Fig. 5, relays 507 to 516, inclusive, comprise the group of selecting relays at the second station. Relays 517 to 521, inclusive, comprise a portion of the driving circuit. A group of relays, such as 500 to 504, inclusive, is associated with each circuit interrupter, such as C, that it is desired to control and supervise. These relays are of the usual type. A key K—5 is provided for disconnecting the remote control equipment in order that the circuit interrupter may be tested and repaired unhindered by remote control.

Relays 600 to 619, inclusive, (Fig. 6) comprise the remaining portion of the driving circuit at the second station.

Relays 700 to 723, inclusive, (Fig. 7) comprise the group of counting relays at the second station. Relays 724 and 725 are slow-release relays of the usual type and control certain releasing operations.

A group of relays, such as 800 to 802, inclusive, and 806 and 807 are associated with each measuring device, such as measuring device 808. The relays 801 and 802 have their armatures mechanically interlocked in a manner previously described. The mechanical construction of the metering device 808 and its associated transmitting apparatus has been previously described in the copending application of Raymond T. Pierce, Serial No. 684,063, filed January 2, 1924, and assigned to the Westinghouse Electric & Manufacturing Company. The metering device comprises a Kelvin balance 808 having movable coils 840 and 841 which are mechanically connected to an armature 810 of a galvanometer-type ammeter 809.

The frame carrying the movable coils 840 and 841 is provided with a contact-making device 842 that is adapted to engage the contact members 843 and 844. The closure of the contact-making device with either of its contact members completes a circuit for the motor 813. The motor 813 is adapted to operate the contact-making member 812 about a resistor 811. The resistor 811 is connected to two terminals of the battery. The contact member 812 is connected through the armature 810 of the galvanometer 809. The operation of the sending instrument is such that, when it is connected to the electrical circuit 845 by the operation of the relays 806 and 807, the movable coils 840 and 841 are operated to cause the contact-making member 842 to engage one of its contact members 843 or 844. This causes the operation of the motor 813 in one direction or the other so as to move the contact-making member 812 in a direction towards one or the other terminals of the battery. This regulates the current flow through the armature 810 of the galvanometer 809. The armature 810 exerts a certain torque on the movable coils and tends to bring the movable coils of the Kelvin balance to a stationary position.

When there is sufficient current flow from the armature 810 to accomplish this result, the circuit of the motor 813 is opened and the current flow in the circuit, including the armature 810, is proportional to the energy traversing the power circuit 845. The manner in which this transmitting mechanism functions in connection with the indicating devices at the first station will be described subsequently.

Having briefly described the apparatus shown in the drawings, I will now explain its detailed operation. For this purpose, it will be assumed first that the dispatcher desires to close the circuit interrupter C at the second station. In order to accomplish this result, the dispatcher will operate the key K—1 into a position opposite from that shown. As a result of the operation of the key K—1, a control circuit is prepared at the spring 318 and ground is removed from the conductor extending to the key K—12 at spring 322.

The dispatcher will now operate the starting key K—13. As a result of this operation, there is a circuit completed extending from ground by way of springs of key K—13, back contact and armature 433, armature 425 and its front contact, armature 422 and its back contact, and relay 401 to battery. The relay 401 is energized to complete a circuit at armature 421 over a path that extends from ground by way of back contact and armature 419, armature 421 and its front contact, relay 402 and relay 401 to battery. The relay 402 is short-circuited so long as the original energizing circuit for the relay 401 is maintained. When the key K—13 is released, the short-circuit is removed from the relay 402 and this relay is permitted to energize.

Normally, there is a holding circuit completed that extends from ground by way of back contact and armature 423, holding relay 403, conductor 360, back contact and armature 357, conductor 363, armature 545 and its back contact, armature 548 and its back contact, conductor 562, armature 638 and its back contact, and relay 603 to battery. The holding relays 403 and 603 are energized in series.

The relay 403 is operated to open one point in the locking circuit of the relay 400 at armature 424, to prepare a starting circuit at armature 425, and to complete a circuit for the relay 405 at armature 426. The relay 405 is energized over a circuit that extends from ground by way of back contact and armature 420, armature 426 and its front contact, and relay 405 to battery. The relay 405 is energized to establish a locking circuit for itself over a path that extends from ground by way of armature 167 and its back contact, conductor 11, armature 428 and its front contact, and relay 405 to battery. Another result of the operation of the relay 405 is that a circuit is prepared at the armature 429 for the relay 408.

At the second station, when the holding relay 603 is energized, the locking circuit of the relay 604 is opened at armature 629, and a circuit is prepared at the front contact of this armature for the relay 607. At armature 628, a circuit is completed for the relay 610 over a path extending from ground by way of back contact and armature 630, armature 628 and its front contact, and relay 610 to battery. Another result of the operation of the relay 603 is that a starting circuit is prepared at armature 627. The relay 610 is energized to prepare a circuit for the relay 601 at armature 646 and to complete a locking circuit for itself over a path that extends from ground by way of armature 756 and its back contact, conductor 762, armature 647 and its front contact, and relay 610 to battery.

Now, when the relay 402 is energized, as before described, the above traced holding circuit, including the holding relays 403 and 603, is opened and these relays are deenergized. As a result of the deenergization of the relay 403, a locking circuit is prepared for the relay 400 at armature 424, one point in the starting circuit is opened at armature 425, and a circuit is completed extending from ground by way of back contact and armature 420, armature 426 and its back contact, relay 408, and front contact and armature 429 to battery. The relay 408 is energized to open an additional point in the starting circuit at armature 433, and to prepare a point in the driving circuit at armature 434.

At the second station, when the relay 603 is deenergized, a locking circuit is prepared for the relay 604 at armature 629, one point in the starting circuit is opened at armature 627, and at armature 628 the original energizing circuit of the relay 610 is opened. At armature 628, a circuit is completed that extends from ground by way of back contact and armature 630, armature 628 and its back contact, relay 601, and front contact and armature 646 to battery. The relay 601 is energized to complete the driving circuit at armature 623, and to prepare a new starting circuit at armatures 621 and 622.

The driving circuit is now completed over a path that extends from battery by way of back contact and armature 444, relay 413, back contact and armature 457, back contact and armature 432, armature 434 and its front contact, conductor 460, front contact and armature 623, armature 625 and its back contact, back contact and armature 648, line relay 615, and armature 663 and its back contact to ground. The line relays 413 and 615 are energized in series.

The relay 413, upon operating, completes a circuit at armature 448 for the relay 411, and at armature 447 completes a circuit for the relay 410. The relay 411 is energized to open one point in the locking circuit of the relays 414 and 415 at armature 441, and to complete a circuit for the relay 412 at armature 442 over a path that extends from ground upon grounded conductor 11 by way of armature 449 and its back contact, armature 442 and its front contact, relay 412 and relay 411 to battery. The relay 412 is short-circuited so long as the original energizing circuit of the relay 411 is closed.

The relay 410 is energized to open one point in the locking circuit of the relay 409 at armature 438, to complete a locking circuit for itself at armature 439, to ground upon grounded conductor 11, and to complete an impulsing circuit at armature 447 over a path that extends from ground by way of back contact and armature 445, armature 440 and its front contact, conductor 231, relay 208, conductor 13, armature 142, relay 111, back contact and armature 145, and back contact and armature 168 to battery. The relays 208 and 111 are energized over this circuit.

The relay 111 is operated to complete a circuit over a path that extends from ground by way of armature 166 and its back contact, armature 144 and its front contact, relay 110, relay 111, back contact and armature 145, and back contact and armature 168 to battery. The relay 110 is not energized until the original circuit of the relay 111 is opened.

The relay 208 is energized to open the circuit of the relay 207. The relay 207 is deenergized to complete a circuit that extends from ground by way of armature 223 and its front contact, back contact and armature 224, conductor 230, relay 407, and front contact and armature 430 to battery. The relay 207 is normally energized over a path that extends from ground by way of back contact and armature 225 and relay 207 to battery.

The slow-release relay 406 is normally energized over a path that extends from ground by way of back contact and armature 427, and relay 406 to battery. The relay 407 is energized to establish a locking circuit for itself to ground upon grounded conductor 11 at armature 431, and to open the driving circuit, including the line relays 413 and 615, at armature 432.

The relay 413 is deenergized to open the original energizing circuit of the relay 410 at armature 447, and to remove the short-circuit from the relay 412 at armature 448. The relay 412 is operated to open another point in the circuit of the relay 413 at armature 444, to open the circuit of the relays 208 and 111 at armature 445, and to complete a circuit at the front contact of this armature over a path that extends from ground by way of said armature and its front contact, relay 417, conductor 12, and back contact and armature 168 to battery. The relay 417 is energized to establish a locking circuit for itself to ground upon grounded conductor 11 at armature 458, to open another point in the circuit of the line relay 413, and to prepare one point in the circuit of the line relay 415 at armature 457.

The relay 208 is deenergized to complete a circuit for the relay 207. The relay 207 is energized to open the original energizing circuit of the relay 407 at armature 224. The relay 407 is maintained energized by reason of the fact that its locking circuit is completed.

The opening of the orignal circuit of the relay 111 also removes the short-circuit from the relay 110, and this relay is operated in series with the relay 111. The relay 110, upon being energized, operates to prepare a circuit for the counting relay 123 at armature 141, to open another point in the original energizing circuit of the relay 111 at armature 142, and to complete a circuit over a path extending from ground by way of armature 166 and its back contact, armature 165 and its back contact, armature 143 and its front contact, conductor 28, armature 354 and its back contact, and relay 315 to battery.

The relay 315 is energized to complete a circuit at armature 352 over a path that extends from ground by way of armature 166 and its back contact, conductor 29, armature 352 and its front contact, relay 316, and relay 315 to battery, and at armature 353 to complete a circuit extending from ground by way of said armature and its front contact, back contact and armature 355, conductor 361, and relay 404 to battery. The relay 404 is energized to open the circuit of the slow-release relay 406 at armature 427. The relay 406 is deenergized after a short interval of time to open the circuit of the relay 407. The relay 407 is deenergized to establish a point in the driving circuit.

At the second station, when the line relay 615 is energized in series with the relay 413, as previously described, the operation of the line relay 615 completes a circuit at armature 659 for the relay 618, and completes a circuit at armature 660 for the relay 617. The relay 617 is energized to open one point in the locking circuits of the relays 613 and 614 at armature 655, and at armature 666 to complete a circuit that extends from ground upon grounded conductor 762 by way of armature 657 and its back contact, armature 666 and its front contact, relay 616 and relay 617 to battery. The relay 618 is energized to establish a locking circuit for itself to ground upon grounded conductor 762 at armature 667, to open one point in the locking circuit of the relay 619 at armature 668, and to complete a circuit at armature 669 over a path that extends from ground by way of back contact and armature 664, armature 669 and its front contact, conductor 761, armature 728 and its back contact, counting relay 700, back contact and armature 751, and back contact and armature 753 to battery.

The counting relay 700 is energized to complete a circuit over a path extending from ground by way of armature 755 and its back contact, armature 726 and its front contact, relay 701, relay 700, back contact and armature 751, and back contact and armature 753 to battery. The relay 701 is short-circuited so long as the original circuit of the relay 700 is maintained.

Now, when the relay 407 at the first station is operated, the circuit of the relay 615 is opened, as well as the circuit of the relay 413. The relay 615 is thereupon deenergized to open the original energizing circuit of the relay 618 at armature 659, and to open the original energizing circuit of the relay 617 at armature 660. By the latter operation, the short-circuit is removed from the relay 616, and this relay is permitted to operate. The relay 616 is energized to complete a circuit for the relay 602 at armature 661, to open another point in the original energizing circuit of the relay 617 at armature 662, to open another point in the circuit of the relay 615 at armature 663, and to open the original energizing circuit of the counting relay 700 at armature 664.

The relay 602 is energized to establish a locking circuit for itself at armature 624 over a path that extends from ground upon grounded conductor 762, armature 653 and its back contact, armature 624 and its front contact, and relay 602 to battery, to prepare another point in the new driving circuit at armature 625, and to prepare a circuit for the relay 611 at armature 626.

When the original energizing circuit of the counting relay 700 is opened, the short-circuit is removed from the relay 701, and this relay is permitted to operate to prepare a circuit for the relay 712 at armature 727, to open another point in the original energizing circuit of the relay 700 at armature 728, and to complete a circuit at armature 729 over a path extending from ground by way of armature 755 and its back contact, armature 739 and its back contact, armature 729 and its front contact, conductor 575, and relay 518 to battery.

A circuit in multiple with that traced above extends from conductor 575 by way of armature 546 and its back contact, and relay 521 to battery. The relay 521 is energized to complete a circuit extending from ground by way of armature 754 and its back contact, conductor 576, armature 549 and its front contact, relay 520, and relay 521 to battery. The relay 520 is short-circuited so long as the original energizing circuit of the relay 521 is completed.

The relay 518 is energized to complete a circuit extending from ground by way of armature 543 and its front contact, back contact and armature 541, conductor 561, front contact and armature 626, and relay 611 to battery. The relay 611 is energized to establish a locking circuit for itself over a path extending from ground upon grounded conductor 762 by way of armature 653 and its back contact, armature 650 and its front contact, and relay 611 to battery, to complete the driving circuit at armature 649, and to open another point in the circuit of the relay 615 at armature 648.

At this point, attention is called to the fact that the driving circuit at the second station can not be completed until it is assured that the proper counting relay is operated to cause the operation of the relay 518 which, in turn, operates the relay 611. If this relay operation does not occur at the second station, no driving circuit will be completed and the operations will stop at this point. This condition indicates to the dispatcher that the apparatus needs attention.

Likewise, at the first station, the apparatus must function properly before the relay 404 is energized. That is, it is necessary that the relay 208 be properly operated, as well as the relays 110, 111 and 315.

The new driving circuit extends from ground by way of back contact and armature 452, line relay 416, front contact and armature 457, back contact and armature 432, armature 434 and its front contact, trunk conductor 460, front contact and armature 623, armature 625 and its front contact, armature 649 and its front contact, line relay 612, and armature 655 and its back contact to battery.

It will be noted that, before this driving circuit can be completed, the slow-release relay 406 must be deenergized. Inasmuch as the time constant of this relay may be changed from the first station, the speed of operation of the driving circuit is regulated by the time constant of this relay. When the line relay 416 is energized, a circuit is completed for the relay 409 at armature 455, and a circuit is completed at armature 456 for the relay 414. The relay 414 is energized to open the circuit of the relays 411 and 412 at armature 449, and to prepare a circuit for the relay 415 at armature 450.

The relay 412 is deenergized to prepare a circuit for the relay 411 at armature 443, to prepare a circuit for the line relay 413 at armature 444, to open the original energizing circuit of the relay 417 at armature 445, and to prepare one point in the impulsing circuit at the back contact of this armature. The relay 411 is deenergized to open one point in the circuit of the relay 412, and to complete a circuit that extends from ground upon grounded conductor 211 by way of back contact and armature 441, armature 450 and its front contact, relay 415 and relay 414 to battery. This circuit is not effective to energize the relay 415 so long as the original energizing circuit of the relay 414 is completed.

The relay 409 is energized to open the locking circuit of the relay 410 at armature 436, to prepare a locking circuit for itself at armature 435, and to complete an impulsing circuit at armature 437. The relay 410 is deenergized to complete a locking circuit for the relay 409 to ground upon grounded conductor 11.

The impulsing circuit extends from ground by way of back contact and armature 454, armature 437 and its front contact, conductor 232, relay 209, conductor 14, front contact and armature 141, armature 163 and its back contact, relay 123, back contact and armature 145, and back contact and armature 168 to battery.

The relay 123 is energized over this circuit and operates to open the original energizing circuit of the relay 315 at armature 165, and to complete a circuit for the relay 122 at the front contact of this armature over a path that may be traced from ground by way of armature 166 and its back contact, armature 165 and its front contact, relay 122, relay 123, back contact and armature 145, and back contact and armature 168 to battery. This circuit is not effective to energize the relay 122 so long as the original energizing circuit of the relay 123 is completed.

The relay 209 is energized in series with the counting relay 123. The relay 209 operates to open the original energizing circuit of the relay 206. The relay 206 is deenergized to prepare a circuit that extends from ground by way of armature 223 and its back contact, front contact and armature 224, conductor 230, relay 407, to the front contact of armature 430.

By the opening of the original energizing circuit of the relay 315, the short-circuit is removed from the relay 316, and this relay is operated to open the energizing circuit of the relay 404 at armature 355, to open another point in the original energizing circuit of the relay 315 at armature 354, to open another point in the holding circuit at armature 357, and to connect the signalling and control conductors to the selecting relays at armatures 357 and 356.

The relay 404 is immediately deenergized to complete a circuit for the slow-release relay 406. The relay 406 is operated to complete the previously traced circuit for the relay 407. The relay 407 is energized to establish a locking circuit for itself to ground upon grounded conductor 11 at armature 431, and to open the driving circuit, including the relays 416 and 612, at armature 432.

The relay 416 is deenergized to remove the short-circuit from the relay 415 at armature 456, and to open the original energizing circuit of the relay 409 at armature 455. The relay 415 is operated to open another point in the first circuit for the relay 414 at armature 451, to open another point in the driving circuit at armature 452, to open the locking circuit of the relay 417 at armature 453, and to open the impulsing circuit at armature 454. The relay 417 is deenergized to connect the line relay 413 to the driving circuit.

By the opening of the impulsing circuit, a short-circuit is removed from the relay 122, and this relay is energized. Upon operating, the relay 122 prepares a circuit for the counting relay 109 at armature 162, opens another point in the first circuit of the relay 123, and completes a circuit at armature 164 over a path extending from ground by way of armature 166 and its back contact, armature 140 and its back contact, armature 164 and its front contact, conductor 27, and selecting relay 314 to battery.

The selecting relay 314 is energized to associate the signalling and control conductors 362 and 363 with the relay equipment comprising the relays 300 to 304, inclusive. Another result of the operation of the relay 314 is that a circuit is completed for lighting the signalling lamp 343. The lighting of the signalling lamp informs the dispatcher of the position of the selecting apparatus.

As ground has been removed from the conductor that extends to the springs of key K—12, by the operation of the key K—1, there is no circuit completed for the relay 404. The relay 404 is not energized with the result that the relay 406 remains energized, as does the relay 407. By the continued energization of the relay 407, the functioning of the driving circuit is interrupted.

When the line relay 612 is energized in series with the relay 416, as previously described, the relay 612 is operated to complete a circuit at armature 651 for the relay 619, and to complete a circuit at armature 652 for the relay 614. The relay 614 is energized to open the circuits of the relays 616 and 617 at armature 657, and to prepare a circuit for the relay 613 at armature 658.

The relay 616 is deenergized to open one point in the original energizing circuit of the relay 602 at armature 661, to prepare one point in the circuit of the relay 617 at armature 662, to prepare a point in the circuit of the line relay 615 at armature 663, and to prepare one point in the impulsing circuit at armature 664. The relay 617 is deenergized to open one point in the circuit of the relay 616 at armature 666, and to complete a circuit that extends from ground upon grounded conductor 762 by way of back contact and armature 665, armature 658 and its front contact, relay 613, and relay 614 to battery. The relay 613 is not energized so long as the original energizing circuit for the relay 614 is maintained.

The relay 619 is operated to open the locking circuit of the relay 618 at armature 670, to prepare a locking circuit for itself at armature 671, and to complete an impulsing circuit at armature 672. The relay 618 is deenergized to open one point in the impulsing circuit at armature 669, and to complete the locking circuit of the relay 619 to ground upon grounded conductor 762.

The impulsing circuit extends from ground by way of back contact and armature 656, armature 672 and its front contact, conductor 760, front contact and armature 727, armature 741 and its back contact, counting relay 712, back contact and armature 751, and back contact and armature 753 to battery.

The counting relay 712 is energized to open the original energizing circuit of the relay 521 and also the circuit of the relay 519 at armature 739, and to complete a circuit at the front contact of this armature over a path extending from ground by way of armature 755 and its back contact, armature 739 and its front contact, relay 713, relay 712, back contact and armature 751, and back contact and armature 753 to battery. This circuit is not effective to energize the relay 713 so long as the original circuit for the relay 712 is maintained.

When the original circuit of the relay 521 is opened, the circuit for the relay 520 becomes effective. The relay 520 is operated to open one point in the holding circuit at armature 548, and to connect the signalling and controlling conductors 362 and 363 at armature 547 and 548 to the selecting relays. Another result of the operation of the relay 520 is that another point in the original energizing circuit of the relay 521 is opened at armature 546. The relay 518 is deenergized to open another point in the circuit of the relay 519 at armature 542, and to open the circuit of relay 611 at armature 543. The relay 611 is not deenergized by reason of the fact that its locking circuit is still completed.

When the relay 407 at the first station is operated, as before described, the driving circuit is opened and, consequently, the relay 612 at the second station is deenergized. As a result of this operation, the original energizing circuit of the relay 619 is opened at armature 651, and the short-circuit is removed from the relay 613 at armature 652. The relay 613 is energized to open the locking circuits of the relays 611 and 602 at armature 653, to open another point in the original energizing circuit of the relay 614 at armature 654, to open another point in the circuit of the relay 612 at armature 655, and to open the impulsing circuit at armature 656.

The relay 611 is deenergized to open another point in the circuit of the relay 612 at armature 649, and to prepare one point in the circuit of the relay 615 at armature 648. The relay 602 is deenergized to prepare another point in the circuit of the relay 615 at armature 625, to open another point in the circuit of the relay 611 at armature 626, and to open one point in its locking circuit at armature 624.

When the impulsing circuit is opened, the short-circuit is removed from the relay 713 and this relay is operated to prepare an impulsing circuit for the relay 702 at armature 740, to open another point in the original circuit of the relay 712 at armature 741, and to complete a circuit at armature 742 and over a path extending from ground by way of armature 755 and its back contact, armature 730 and its back contact, armature 742 and its front contact, conductor 574, and selecting relay 507 to battery.

The selecting relay 507 is energized to connect the signalling and control conductors 362 and 363, respectively, to the relay group comprising the relays 500 to 504, inclusive, at springs 533 and 534. Another result of the operation of the relay 507 is that there is a circuit completed extending from ground by way of the working contact of spring 535 and said spring, and relay 518 to battery. The relay 518 is energized to prepare a point in the circuit of the relay 519 at armature 542, and to complete a circuit at armature 543 extending from ground by way of said armature and its front contact, back contact and armature 541, conductor 561, to the front contact of armature 626.

The driving circuit, including the line relays 413 and 516, is not completed by reason of the fact that the relay 407 at the first station is locked energized.

By the operation of the selecting relays 314 and 507, a signalling circuit is completed which may be traced from ground by way of front contact and armature 525, working contact of spring 534 and said spring, front contact and armature 547, back contact and armature 544, trunk conductor 362, armature 356 and its front contact, spring 349 and its working contact, armature 332 and its back contact, and relay 303 to ground.

Since there is no battery potential in this circuit, the relay 303 is not energized and no change of the signalling lamps 326 and 327 takes place. On the other hand if the circuit-breaker C had operated, the relay 500 would have been energized to move its armature 525 to its back contact and a circuit would be completed for the relay 303 over the circuit above described but from battery at the back contact of armature 525 so as to energize the relay 303. The lamp 327 would have been extinguished by reason of the fact that a circuit would have opened at armature 328, and the lamp 326 would have become illuminated by reason of the closed circuit over armature 328 and its back contact.

It will be understood, of course, that the selecting operations at the first and second stations occur substantially simultaneously. Consequently, the lighting of the lamp 343 informs the dispatcher that the desired selection has taken place.

In order to close the circuit interrupter C, the dispatcher will operate the main control key K—2. As a result of this operation, the control circuit is completed extending from battery by way of spring 317 and its working contact, working contact of spring 318 and said spring, front contact and armature 324, working contact of spring 350 and said spring, front contact and armature 357, conductor 363, armature 545 and its back contact, armature 548 and its front contact, spring 533 and its working contact, springs of key K—5, armature 524 and its front contact, and relay 503 to ground.

The relay 503 is energized to complete a circuit at armature 529 for the closing coil 505 of the circuit interrupter C. The closing coil 505 operates to close the circuit interrupter, whereupon the circuit of the closing coil is opened by the operation of the auxiliary switch 532.

When the circuit interrupter C is in its open position, it will be noted that there is a circuit completed from the auxiliary switch 531 for the relay 502. The relay 502 is thus energized to complete a circuit for the slow-release relay 501 at armature 528. The slow-release relay 501 is energized to complete a circuit for the slow-to-operate relay 500 at armature 526. The relay 500 is energized to prepare a starting circuit at armature 523, to prepare a signalling circuit at armature 525, and to prepare a control circuit at armature 524.

Now, when the circuit interrupter C is closed, as before described, the relay 502 is immediately deenergized to open the circuit of the slow-release relay 501 at armature 528, and to complete a circuit at armature 527 over a path that extends from ground by way of armature 527 and its back contact, front contact and armature 523, conductor 560, and slow-release relay 600 to battery.

The slow-release relay 600 is energized to establish a locking circuit for itself over a path that extends from ground by way of armature 634 and its back contact, armature 690 and its front contact, and relay 600 to battery. Another result of the operation of the relay 600 is that a circuit is completed that extends from ground by way of front contact and armature 620, front contact and armature 621, armature 622 and its front contact, armature 645 and its back contact, and relay 608 to battery.

The relay 608 is energized to prepare one point in the circuit of the relay 607 at armature 641, to open a point in the locking circuit of the relay 600 at armature 643, and to complete a circuit at armature 642 extending from ground by way of back contact and armature 640, armature 642 and its front contact, relay 609, and relay 608 to battery. This circuit is not effective to cause the energization of the relay 609 so long as the original circuit for the relay 608 is maintained.

The slow-release relay 501 is deenergized, after a short interval of time, to open the circuit of the relay 500. The relay 500 is deenergized, after a short interval of time, to connect battery to the signalling circuit at armature 525, to prepare a circuit for the relay 504 at armature 524, and to open the original energizing circuit for the relay 600 at armature 523.

By the connection of battery to the signalling circuit, a circuit is completed for the relay 303 at the first station. The relay 303 is energized to attract the armature 331. The operation of the armature 331 permits the armatures 328, 329 and 330 of the relay 302 to assume their normal position. As a result of the operation of the armature 328, the lamp 327 is extinguished and the signalling lamp 326 is lighted. The operation of the armature 330 opens one point in the circuit of the relay 300. The operation of the armature 329 completes a circuit for the relay 304.

The relay 304 is energized to prepare a circuit for the relay 302 at armature 333, and to open the circuit of the relay 303 at the back contact of this armature. Another result of the operation of the relay 304 is that a circuit is completed extending from battery by way of armature 333 and its front contact, relay 301, working contact of spring 321 and said spring to ground.

The relay 301 is energized to attract the armature 325, thereby permitting the armatures 323 and 324 of the relay 300 to restore to normal. As a result of the operation of the armature 323, ground is placed upon the conductor extending to key K—12. As a result of the operation of the armature 324, the control circuit is opened at another point and a new control circuit is prepared at the back contact of this armature. By the change in signalling devices, the dispatcher is informed that the desired operation has been completed at the second station.

A circuit is now completed for the relay 404 extending from ground by way of spring 320 and its working contact, back contact and armature 323, springs of key K—12, working contact of spring 351 and said spring, conductor 361, and relay 404 to battery. The relay 404 is energized to open the circuit of the slow-release relay 406. After a short interval of time, the relay 406 is deenergized to open the circuit of the relay 407. The relay 407 is deenergized to complete the driving circuit.

The line relays 413 and 416 at the first station and the line relays 615 and 612 at the second station are now alternately operated over the driving circuit in substantially the same manner as before described. The operation of the line relays 413 and 416 causes the operation of the counting relays 109, 108, 121, 120, 107, 106, 119, 118, 105, 104, 117, 116, 103, 102, 115, 114, 101, 100, 113 and 112 in the sequence mentioned. The operation of the counting relays controls the operation of the selecting relays in the following sequence 313, 312, 311, 310, 309, 308, 307, 306 and 305.

The selecting relays operate to associate the signalling and control conductors with the various relay groups associated with the different keys and also control the functioning of the relays 404 and 406. The relays 208 and 209 are alternately operated by the energization of the line relays 413 and 416 in their control of the counting relays so as to cause the alternate operation of the relays 207 and 206. The functioning of the relays 207 and 206 controls the energization of the relay 407.

As a consequence of the interlinked operation of these relays, it is necessary that all the circuits be completed properly at each point before the driving circuit is closed. That is, the line relays must be energized alternately to control the proper sequential operation of the counting relays. The relays 208 and 209 must be energized alternately to control the alternate operation of the relays 206 and 207. These relays, in turn, must be energized in the proper sequence to control the energization of the relay 407. The selecting relays must also be operated properly in order to cause the operation of the relays 404 and 406.

Should the relays 208 and 209 be energized at the same time, the relays 206 and 207 will also be energized. With these relays in their energized positions, there is no circuit completed for the relay 407. Consequently, the driving circuit cannot function by reason of the fact that the driving circuit is not opened to cause the deenergization of the line relays that are connected thereto. The cycle of operations by which the selecting relays are energized at the first station in sequence occurs at high speed, and there is no interruption in the operation by reason of the fact that it has been assumed that the dispatcher does not desire to operate any other apparatus unit at the second station.

At the second station, the alternate operation of the line relays 615 and 612 causes the operation of the counting relays 702, 703, 714, 715, 704, 705, 716, 717, 706, 707, 718, 719, 708, 709, 720, 721, 710, 711, 722 and 723 in the sequence mentioned. The operation of these counting relays controls the energization and deenergization of the selecting relays 508, 509, 510, 511, 512, 513, 514, 515 and 516 in the sequence set forth. The operation of the selecting relays, in turn, controls the operation of the relays 517 and 518 which operate to complete the circuit of the relay 611. Thus, if two selecting relays should be energized at the same time, there will be no circuit completed for the relay 611 and it will not function to connect one or the other of the line relays to the driving circuit. The simultaneous operation of the relays 517 and 518 also completes a circuit for the relay 519. The relay 519 operates the armatures 544 and 545 to open the signalling and control circuits.

By the interruption of the driving action, the dispatcher is informed that there is trouble in the circuit and that the apparatus is not functioning properly. However, he will be unable to cause any false operation or receive any false signals by reason of the fact that the signalling and control conductors are opened by the operation of the relay 519.

It is also noted that the line relays 612 and 615 must be alternately connected to the driving circuit and energized in order to cause the proper operation of the relay 602, which also controls the operation of the relay 611 and the connection of the line relays to the driving circuit. By these provisions, it is impossible to cause false operation of the selecting apparatus, regardless of apparatus defects that may manifest themselves.

These circuit arrangements also make it possible to operate the selecting system where the trunk line connecting the first and second station is adjacent to a power line. The disturbances induced from the power line will not affect the efficient functioning of the apparatus.

As a result of the operation of the line relay 416, the relay 113 is energized to open the circuit of the selecting relay 305 at armature 147, and to complete a circuit for the relay 112 at the front contact of this armature. The relay 112 is not energized so long as the original energizing circuit for the relay 113 is closed. The relay 305 is deenergized to extinguish the signalling lamp 334, to open certain signalling and control circuits, and to remove ground from the winding of the relay 404 whereby this relay is deenergized to complete a circuit for the slow-release relay 406. The slow-release relay 406 is energized to complete a circuit for the relay 407. The relay 407 is operated to open the circuit of the line relays 416 and 612.

The relay 416 is deenergized to remove the short-circuit from the relay 415. The relay 415, upon operating, opens one point in the circuit of the line relay 416 at armature 452, opens the locking circuit of the relay 470 at armature 453, and at armature 454 opens the circuit of the relays 208 and 113.

The relay 112 is now energized and, upon operating, opens another point in the original energizing circuit of the relay 113 at armature 146, and removes the short-circuit from the relay 125 at armature 145.

The relay 205 is deenergized to complete a circuit for the relay 207. The relay 207 is energized to open the original energizing circuit of the relay 407. The relay 125 is energized to complete a circuit for the relay 124 at armature 169. The relay 124 is energized to open the circuits of the relays 100 to 123, inclusive, and the relay 125 at armature 166, to remove ground from conductor 11 at armature 167, and to place ground upon conductor 10 at the front contact of this armature.

Another result of the operation of the relay 124 is that ground is removed from the conductor 29, whereby the circuit of the relays 315 and 316 is opened. The relay 315 is deenergized to open another point in the circuit of the relay 316 and to open another point in the circuit of the relay 404. The relay 316 is deenergized to prepare a circuit for the relay 315, to prepare a point in the circuit of the relay 404 at armature 355, to open the signalling and control circuits at armatures 356 and 357, and to prepare a holding circuit at the back contact of the latter armature.

The counting relays 100 to 123, inclusive, are immediately deenergized to restore certain circuits to normal. The relay 125 is deenergized, after a short interval of time, to open the circuit of the slow-release relay 124. The removal of ground from conductor 11 opens the locking circuit of the relays 407, 405, 414 and 415. These relays are deenergized to restore certain circuits to normal.

Through the grounding of conductor 10, a circuit is completed for the relay 400. The relay 400 is energized to establish a locking circuit for itself at armature 418, to open the circuits of the relays 401 and 402 at armature 419, and to open the circuit of the relay 408 at armature 420. The relay 401 is deenergized to open one point in the circuit of the relay 402 at armature 421. The relay 402 is deenergized to prepare a circuit for the relay 401 at armature 422, and to prepare a holding circuit at armature 423. The relay 408 is deenergized to prepare one point in the starting circuit at armature 433, and to open the driving circuit at armature 434.

At the second station, the relay 722 is energized as a result of the operation of the line relay 612. The relay 722 is energized to open the circuit of the relay 516 at armature 750, and to complete a circuit for the relay 723 at the front contact of this armature. The relay 723 is short-circuited so long as the original energizing circuit of the relay 722 is closed.

The relay 516 is deenergized to open the circuit of the relay 517 and to open the signalling and control circuits. The relay 517 is deenergized to open the original energizing circuit of the relay 611 at armature 541. When the line relay 612 is energized, a circuit is completed for the relay 614, whereby the relays 616 and 617 are deenergized. As a result of the deenergization of the relay 616, the original energizing circuit of the relay 602 is opened.

When the relay 407 at the first station is energized, as before described, the circuit of the relay 612 is opened and this relay is deenergized to permit the operation of the relay 613. The relay 613 opens the locking circuits of the relays 602 and 611, whereby these relays are deenergized. The deenergization of these relays prepares a circuit for the line relay 615. Another result of the operation of the relay 613 is that the short-circuit is removed from the relay 723. The relay 723 is immediately energized to remove the short-circuit from the slow-release relay 724. The relay 724 is operated to remove ground from conductor 576 and to prepare a circuit for the relay 725.

The removal of ground from conductor 576 brings about the deenergization of the relays 520 and 521. The relay 521 is deenergized to open another point in the circuit of the relay 520. The relay 520 is deenergized to prepare a circuit for the relay 521 at armature 546, to open the signalling and control circuits at armatures 547 and 548, respectively, and to prepare a holding circuit at the back contact of the latter armature.

The relay 725 is energized to open the circuits of the counting relays 700 to 723, inclusive, and the relay 724 at armature 755, to remove ground from conductor 762 at armature 756, and to connect ground to conductor 763 at the front contact of this armature. The relays 700 to 723, inclusive, are immediately deenergized to restore their respective armatures to normal. The relay 724 is deenergized, after a short interval of time, to open the circuit of the relay 725.

The removal of ground from conductor 762 brings about the deenergization of the relays 613 and 614, and also of the relay 610. The relay 610 is deenergized to open the circuit of the relay 601 at armature 646. The relay 601 is deenergized to prepare a starting circuit at armature 622, and to open the driving circuit at armature 623.

By the connection of ground to conductor 763, a circuit is completed for the relay 604. The relay 604 is immediately operated to open another point in the circuit of the relay 601 at armature 630, to establish a locking circuit for itself at armature 631, to open another point in the circuit of the relays 605 and 606 at armature 632, and to open another point in the circuit of the relay 607 at armature 633.

A holding circuit is now established that extends from ground by way of back contact and armature 423, relay 403, conductor 360, back contact and armature 357, conductor 363, armature 545 and its back contact, armature 548 and its back contact, conductor 562, armature 638 and its back contact, and relay 603 to battery. The holding relays 403 and 603 are energized in series.

The relay 403 is operated to open the locking circuit of the relay 400 at armature 424, to prepare a starting circuit at armature 425, and to prepare a circuit for the relay 405 at armature 426. The relay 400 is energized to prepare a point in the circuits of the relays 402 and 401 at armature 419, and to complete a circuit extending from ground by way of back contact and armature 420, armature 426 and its front contact, and relay 405 to battery. The relay 405 is energized to prepare a point in the circuit of the relay 408 at armature 429, and to prepare a locking circuit for itself at armature 428.

Now, when the slow-release relay 124 is deenergized, ground is removed from the conductor 10 and is placed upon the conductor 11. The grounding of conductor 11 completes a locking circuit for the relay 405.

At the second station, the holding relay 603 is energized to prepare a starting circuit for itself at armature 627, to prepare a circuit for the relay 610 at armature 628, to open the locking circuit of the relay 604 at armature 629, and to prepare a point in the circuit of the relay 607 at the front contact of this armature. The relay 604 is deenergized to prepare a point in the circuit of the relay 607 at armature 633, to prepare a point in the circuit of the relay 606 at armature 632, and to complete a circuit at armature 630 that extends from ground by way of back contact and said armature, armature 628 and its front contact, and relay 610 to battery. The relay 610 is energized to prepare a point in the circuit of the relay 601 at armature 646, and to prepare a locking circuit for itself at armature 647.

When the slow-release relay 725 is energized and ground is connected to the conductor 762, a locking circuit is established for the relay 610. In the manner described above, the selecting apparatus at the first and second stations is restored to normal after the completion of the desired selecting operation.

It will be remembered that, following the operation of the circuit interrupter C, the relay 608 at the second station was operated, and a circuit was completed for the relay 609. When the relay 601 is deenergized, as described before, the original energizing circuit of the relay 608 is opened, and the relay 609 is operated over a circuit in series with the relay 608. The relay 609, upon operating, prepares a starting circuit at armature 644, and at armature 645 opens another point in the original energizing circuit of the relay 608.

Now, when the holding relay 603 is energized, a circuit is completed that extends from ground by way of armature 644 and its front contact, front contact and armature 627, armature 622 and its back contact, armature 637 and its back contact and relay 605 to battery.

The relay 605 is energized to prepare a locking circuit for the relay 600 at armature 634, and to complete a circuit at armature 635 that extends from ground by way of back contact and armature 632, armature 635 and its front contact, relay 606, and relay 605 to battery. This circuit is not effective so long as the original energizing circuit of the relay 605 is effective.

Another result of the operation of the relay 605 is that a circuit is completed that extends from ground by way of armature 629 and its front contact, armature 633 and its back contact, armature 636 and its front contact, relay 607, and front contact and armature 641 to battery. The relay 607 is energized to open the circuits of the relays 608 and 609. The relay 609 is deenergized to open the original energizing circuit of the relay 605 at armature 644, and to prepare a circuit for the relay 608 at armature 645. The relay 608 is deenergized to open the circuit of the relay 607 at armature 641, to open one point in the circuit of the relay 609 at armature 642, and to prepare a locking circuit for the relay 600 at armature 643. The relay 607 is deenergized to prepare another point in the circuit of the relay 609.

When the original circuit of the relay 605 is opened, the circuit of the relays 606 and 605 in series becomes effective, and the relay 606 is operated to open another point in the circuit of the relay 605 at armature 637, to prepare another point in the locking circuit of the relay 600 at armature 639, and to open the holding circuit, including the relays 603 and 403 at armature 638. The deenergization of the holding relays initiates the operation of the selecting apparatus in the same manner as before described. This reoperation of the selecting apparatus merely serves to check the condition of all the signalling devices at the first station. The selecting action and the release operations take place in substantially the same manner as before described.

In the event that a circuit interrupter is operated at the second station, under automatic control (not shown) or manually, the dispatcher must be informed of the change in position. To describe this operation, it will be assumed that the circuit interrupter C is closed and that it is tripped by the action of automatic devices of the usual type, such as an overload relay (not shown). When the circuit interrupter C is tripped, a circuit is immediately completed for the relay 502. The relay 502 is energized to complete a circuit for the slow-release relay 501 at armature 528. The relay 501 is energized to complete a circuit for the slow-release relay 500 at armature 526.

Before the slow-release relay 500 has had time to operate its armatures, or, in fact, before this circuit is completed, there is completed a circuit extending from ground by way of armature 527 and its front contact, back contact and armature 523, conductor 560, and slow-release relay 600 to battery.

The slow-acting relay 600 is energized to establish a locking circuit for itself. This locking circuit extends to ground on the armature 634, regardless of whether the relay 605 is in energized or deenergized condition.

The relay 600 functions to cause the operation of either the relays 608 or 609, or the operation of either the relays 605 or 606, depending upon whether the selecting apparatus is functioning or is normal, as will be apparent. When the slow-release relay 500 is energized, the original energizing circuit of the relay 600 is opened. The action of the selecting equipment will be obvious from the preceding descriptions and the dispatcher's signalling devices will be operated so that they indicate the proper position of the circuit interrupter C.

The manner in which the dispatcher is able to observe the electrical characteristics in any circuit for any desired length of time will now be described. To describe this operation, it will be assumed that the dispatcher desires to ascertain the load carried in the circuit 845 at the second station.

To accomplish this result, the dispatcher will operate the key K so that its springs assume a position opposite from that shown in the drawings and will then operate the start key K—13. By the operation of the start key K—13, the driving circuit begins to function to operate the counting relays at both the first and second stations in a predetermined sequence. As a result of the operation of the counting relays at each station, the associated selecting relays are operated in a definite sequence. These operations take place in substantially the same manner as before described.

It will be seen that, when the key K is operated to a position opposite from that shown, ground is removed from the conductor 15 that extends by way of the key K—7 to the working contact of spring 347 of the selecting relay 309. Consequently, when the selecting relay 309 at the first station is energized, there will be no circuit completed for the relay 400, and the action of the driving circuit will be interrupted, with the selecting relay 309 at the first station energized and the selecting relay 512 at the second station energized.

A circuit is now completed that extends from ground by way of resting contact of spring 241 and said spring, conductor 16, working contact of spring 346 and said spring, front contact and armature 357, trunk conductor 363, armature 545 and its back contact, armature 548 and its front contact, spring 536 and its working contact, conductor 563, armature 814 and its back contact, and relay 801 to battery.

The relay 801 is energized to complete a circuit for the relay 800 at armature 816, and to complete a metering circuit at armature 818. The armatures 816 and 818 are latched in their operated position by the operation of the armature 819 of the relay 802 in an obvious manner. The relay 800 is energized to open the circuit of the relay 801 and to prepare a circuit for the relay 802 at armature 814, and to complete a signalling circuit at armature 815 that extends from battery by way of front contact and said armature, conductor 564, working contact of spring 537 and said spring, front contact and armature 547, back contact and armature 544, conductor 362, armature 356 and its front contact, spring 345 and its working contact, conductor 17, armature 222 and its back contact, and relay 203 to ground.

The relay 203 is energized to complete a circuit for the relay 202 at armature 218, and to close the metering circuits at armatures 219 and 220. The relay 202 is energized to open the circuit of the signalling device 216 and to complete a circuit for the signalling device 217 at armature 213, and to place ground upon conductor 16 at armature 215.

Another result of the operation of the armature 213 is that a circuit is completed for the relay 205. The relay 205 is energized to open the circuit of the relay 203 at armature 222, and to prepare a circuit for the relay 204 at the front contact of this armature.

By the grounding of conductor 16, a circuit is completed for the relay 404. The relay 404 is energized to open the circuit of the relay 406. The relay 406 is deenergized, after a short interval of time, to open the circuit of the relay 407. The relay 407 is deenergized to complete the driving circuit. The remaining operations of the selecting apparatus take place in the same manner as before described. The metering circuits completed by the operation of the latching relays 801 and 203 will now be described.

It will be seen that the relays 806 and 807 are energized in multiple with the relay 800 at the second station. The relay 806 operates to connect the current transformers 803 and 804 to the stationary coils of the Kelvin balance 808. These connections render the operation of the Kelvin balance under the control of the power or watts in the circuit 845. The Kelvin balance 808 functions in the ordinary manner to operate the movable coils in one direction or the other so as to bring the contact-making member 842 into engagement with the contact member 843 or 844, depending upon the direction of torque exerted by the armature 810 of the ammeter 809.

The amount of torque exerted by the armature 810 is controlled by the amount of current flowing over a circuit from battery by way of resistor 811, contact-making member 812, armature 810, front contact and armature 819, conductor 234, armature 219 and its front contact, and indicating device 201 to ground. The value of the current traversing this circuit is, of course, controlled by the position of the contact-making member 812.

It will be assumed that the value of the current in this circuit is such that the torque exerted upon the movable coils 840 and 841 of the Kelvin balance is such as to bring the contact-making member 842 into engagement with the contact-making member 843. A circuit is thereby completed for the motor 813.

The motor 813 operates to rotate the contact-making device 812 towards the negative terminal of the battery. Consequently, the current flow over the metering circuit just described is increased and a corresponding change occurs at the first station to inform the dispatcher of the operation at the second station. When the current in this circuit reaches a value such that the armature 810 exerts sufficient torque to bring the contact-making member 842 out of engagement with the contact-making member 843, the circuit of the motor 813 is opened and the current flow over the metering circuit is proportional to the power in the circuit 845. Any change in the power of the circuit 845 causes the operation of the motor 813 to bring about a change of current in the metering circuit.

It will be seen that the relays 203 and 801 at the first and second stations, respectively, may be connected in as many metering circuits as desired by providing additional conductors extending between the first and second stations and additional contacts on these relays. The operations in these cases are obvious.

It will be obvious, of course, that additional latching relays may be selected by the operation of the different selecting relays at the station. The operation of the signalling devices, such as 216 and 217, at the first station indicates to the dispatcher what metering circuits are connected, so that he may observe the electrical characteristics in the various circuits.

It is apparent that, in place of the sending instrument 808 being operated to send the amount of power in the circuit 845, the circuit connections of the Kelvin balance may be changed so as to indicate any electrical characteristic in the circuit. All that is necessary is that the sending devices at the second station be properly connected to the power circuits and the receiving or indicating devices at the first station be calibrated to indicate the proper quantity. The dispatcher may have these metering circuits connected so long as he desires and may operate the selective equipment, in the manner before described, to control any apparatus unit that he desires, while the metering circuit remains closed.

In the event that only two metering circuits are provided between the first and second stations, the dispatcher may connect these circuits to as many devices as he desires by the operation of additional relays, such as 801 at the second station. That is, the same metering circuit may be used to measure any electrical characteristic in any circuit at the station. Different indicating instruments at the first station will, of course, be provided and will be connected to the metering circuit at the proper time by the operation of the latching relays, such as the relay 203.

In order to disconnect the metering equipment from the circuit 845, it is only necessary for the dispatcher to operate the key K into the position shown in the drawings and then operate the start key. The functioning of the selective equipment finally brings about the energization of the relay 802. The relay 802 operates the armature 819 to permit the armatures 816, 817 and 818 on the relay 801 to restore to their normal position. By the operation of the armature 816, the circuit of the relay 800 is opened, as well as the circuits of the relays 806 and 807. The deenergization of the relays 806 and 807 disconnects the current and voltage transformers from the Kelvin balance 808. The operation of the armature 818 opens the metering circuit. The operation of the armature 817 opens another metering circuit. By these operations, the metering equipment at the second station is disconnected from the metering conductors 233 and 234.

The relay 800 is deenergized to place ground upon conductor 546, whereby the relay 204 at the first station is operated. The operation of the relay 204 brings about the disconnection of the indicating instruments 201 and 200 from the metering conductors 233 and 234 and the opening of the circuit of the relay 202. The relay 202 is deenergized to extinguish the signalling lamp 217 and to illuminate the signalling lamp 216. The operation of the signalling devices informs the dispatcher that the apparatus at the second station has been disconnected. Another result of the operation of the relay 202 is that circuits are closed for enabling the driving circuit to again function in the manner before described.

Under certain conditions, the dispatcher may find it desirable to connect with a predetermined apparatus unit and remain in connection therewith for a considerable period of time, while the device is operated a plurality of times in order to test its operation, or for any other purpose. To describe the operation of the invention under these conditions, it will be assumed that the dispatcher desires to connect with the circuit interrupter C. In order to now interrupt the operation of the driving circuit at the proper place, the dispatcher will operate the key K—12. When the starting key K—13 is operated, the driving circuit functions as before to control the operation of the various relays in the same manner as before described.

When the selecting relay 314 at the first station is operated, there will be no ground present on the conductor extending to the resting contact of spring 351 of the relay 314 and, consequently, there is no circuit completed for operating the relay 404. It will be seen that, when the key K—12 is depressed, the position of the key K—1 does not, in any way, control the deenergization of the relay 404. Consequently, the action of the driving circuit is interrupted with the selecting relay 314 at the first station and the selecting relay 505 at the second station is energized.

By operating the key K—1 and the control key K—2, the dispatcher may cause as many operations of the circuit interrupter C as he desires. The operation of the circuit interrupter C, of course, controls the operation of the supervisory signalling devices 326 and 327 so that the dispatcher receives indication of the operation. The functioning of these circuits will be obvious from the preceding description.

When the dispatcher desires to permit the operation of the driving circuit, he will restore the key K—12 to normal. As a result of this operation, the relay 404 is energized and the circuit of the slow-release relay 406 is opened. This relay is deenergized to open the locking circuit of the relay 407. The energization of the relay 407 follows with the result that the operation of the driving circuit is again initiated. The selecting apparatus is restored to normal in the same manner as before described.

My invention is not limited to the particular arrangement of the apparatus described, but may be variously modified without departing from the spirit and scope thereof, as set forth in the appended claims.

I claim as my invention:

1. In a signalling system, a first station, a second station, meter devices at said second station, apparatus units at said second station, a receiving device at said first station, distributors at said first and said second station, signalling lines connecting said stations, means for operating said distributors in synchronism, means controlled by said distributors for connecting one of said metering devices at said second station to one of said signalling lines, and said receiving device to said signalling line, and means controlled by the operation of said distributors for connecting said apparatus units to other signalling lines while said meter line connection is maintained.

2. In a signalling system, a first station, a second station, meter devices at said second station, apparatus units at said second station, a receiving device at said first station, relay chains at said first and said second station, signalling lines connecting said stations, means for operating said relay chains in synchronism, means controlled by said relays for connecting one of said metering devices to one of said signalling lines at said second station and said receiving device to said signalling lines and means controlled by said relay chains for connecting said apparatus units to other signalling lines while said meter line connection is maintained.

3. In a supervisory control system, a first station, a second station, a chain of relays at each of said stations, a drive line connecting said stations, means for controlling the transmission of sucessive impulses over said drive line, means responsive to said impulses for operating said chains of relays simultaneously and in synchronism, means whereby the synchronous operation of said chains of relays controls the operation of said impulsing controlling means and means for varying the operation of said impulse controlling means whereby the rate of impulsing is varied.

In testimony whereof I have hereunto subscribed my name this 24th day of April, 1925.

THOMAS U. WHITE.